(12) United States Patent
Yoshida et al.

(10) Patent No.: US 11,699,834 B2
(45) Date of Patent: Jul. 11, 2023

(54) SEALED BATTERY

(71) Applicant: SANYO Electric Co., Ltd., Daito (JP)

(72) Inventors: Masayoshi Yoshida, Osaka (JP); Oose Okutani, Hyogo (JP); Takahiro Nogami, Osaka (JP); Akira Takano, Osaka (JP)

(73) Assignee: SANYO Electric Co., Ltd., Osaka (JP)

( * ) Notice: Subject to any disclaimer, the term of this patent is extended or adjusted under 35 U.S.C. 154(b) by 184 days.

(21) Appl. No.: 17/418,956

(22) PCT Filed: Jan. 16, 2020

(86) PCT No.: PCT/JP2020/001197
§ 371 (c)(1),
(2) Date: Jun. 28, 2021

(87) PCT Pub. No.: WO2020/149350
PCT Pub. Date: Jul. 23, 2020

(65) Prior Publication Data
US 2022/0115756 A1    Apr. 14, 2022

(30) Foreign Application Priority Data
Jan. 18, 2019   (JP) .................... 2019-006677

(51) Int. Cl.
*H01M 50/578* (2021.01)
*H01M 50/342* (2021.01)
(Continued)

(52) U.S. Cl.
CPC ....... *H01M 50/578* (2021.01); *H01M 50/147* (2021.01); *H01M 50/152* (2021.01);
(Continued)

(58) Field of Classification Search
CPC ........... H01M 50/342; H01M 50/3425; H01M 50/574; H01M 50/578; H01M 50/184; H01M 50/186
See application file for complete search history.

(56) References Cited

U.S. PATENT DOCUMENTS

| 2017/0062778 A1 | 3/2017 | Mille et al. |
| 2019/0103625 A1 | 4/2019 | Haraguchi et al. |

FOREIGN PATENT DOCUMENTS

| JP | H11-111264 A | 4/1999 |
| JP | 2007-149433 A | 6/2007 |

(Continued)

OTHER PUBLICATIONS

International Search Report dated Mar. 31, 2020, issued in counterpart International Application No. PCT/JP2020/001197 (2 pages).
(Continued)

*Primary Examiner* — Amanda J Barrow
(74) *Attorney, Agent, or Firm* — WHDA, LLP

(57) ABSTRACT

A sealed battery, which is an exemplary embodiment, comprises a battery case including a bottomed cylindrical outer can and a sealing body that closes an opening of the outer can, a gasket disposed between the outer can and the sealing body, and an electrode body including an electrode and housed in the battery case. The sealing body includes a metal plate, and the metal plate has a thin portion formed in an annular shape, a valve portion having a convex shape inside the battery case, and an annular portion to which the electrode lead is connected. The gasket is provided with an elastically deformable portion that abuts against the inner surface of the valve portion and urges the valve portion to the outside of the battery case.

5 Claims, 6 Drawing Sheets

(51) Int. Cl.
    *H01M 50/197*     (2021.01)
    *H01M 50/164*     (2021.01)
    *H01M 50/152*     (2021.01)
    *H01M 50/147*     (2021.01)
    *H01M 50/574*     (2021.01)
    *H01M 50/186*     (2021.01)
    *H01M 50/184*     (2021.01)

(52) U.S. Cl.
    CPC ....... *H01M 50/164* (2021.01); *H01M 50/184* (2021.01); *H01M 50/186* (2021.01); *H01M 50/197* (2021.01); *H01M 50/342* (2021.01); *H01M 50/574* (2021.01)

(56) References Cited

FOREIGN PATENT DOCUMENTS

| | | | | |
|---|---|---|---|---|
| JP | 2008-269904 A | | 11/2008 | |
| JP | 2018-525793 A | | 9/2018 | |
| JP | 2019-29306 A | | 2/2019 | |
| KR | 10-2018-0005455 | * | 1/2018 | .............. H01M 2/04 |
| WO | 2017/164000 A1 | | 9/2017 | |

OTHER PUBLICATIONS

Office Action dated Sep. 29, 2022, issued in counterpart CN application No. 202080009399.3, with English translation. (8 pages).

\* cited by examiner

SEALED BATTERY

TECHNICAL FIELD

The present disclosure relates to a sealed battery.

BACKGROUND ART

There is conventionally widely known a sealed battery comprising a battery case including a bottomed tubular exterior can and a sealing assembly sealing an opening of the exterior can. For example, PATENT LITERATURE 1 discloses a cylindrical sealed battery comprising a sealing assembly constituted of a metal plate having a downward projecting shape convex toward the inside of the battery case. PATENT LITERATURE 1 discloses that the sealing assembly inverts upon occurrence of abnormality in the battery and causes a welding portion between the sealing assembly and a current collector portion to fracture, and thereby, current is interrupted and safety is secured.

CITATION LIST

Patent Literature

PATENT LITERATURE 1: Japanese Unexamined Patent Application Publication No. 2008-269904

SUMMARY

Technical Problem

A current interruption device (CID) is provided in a sealing assembly as disclosed in PATENT LITERATURE 1, and it is an important problem to disconnect the current path of the battery securely with the current interruption device upon occurrence of abnormality in the battery.

Solution to Problem

A sealed battery which is an aspect of the present disclosure comprises: a battery case including a bottomed tubular exterior can, and a sealing assembly sealing an opening of the exterior can; a gasket arranged between the exterior can and the sealing assembly; and an electrode assembly including an electrode lead and housed in the battery case. The sealing assembly includes a metal plate, and the metal plate includes: a thin part formed into an annular shape; a vent part that has a shape convex toward an inside of the battery case and is to invert so as to be convex toward an outside of the case when an internal pressure of the battery case reaches a predetermined inversion pressure R, the vent part enclosed by the thin part; and an annular part that is positioned on an outside of the thin part and that the electrode lead is connected to. An elastic deformation part that comes into contact with an inner surface of the vent part and urges the vent part toward the outside of the battery case is provided in the gasket.

Advantageous Effects of Invention

According to the sealed battery which is an aspect of the present disclosure, when the internal pressure of the battery case rises upon occurrence of abnormality in the battery, the current path of the battery may be more securely disconnected. Moreover, the state where the current path is disconnected can be readily maintained, and reconduction of the current path can be highly inhibited.

DESCRIPTION OF EMBODIMENTS

Hereafter, an example of embodiments of the present disclosure will be described in detail. While there is hereafter exemplarily illustrated, as an example of embodiments of a sealed battery according to the present disclosure, a cylindrical battery in which a winding-type electrode assembly 14 is housed in a cylindrical battery case 15, the battery may be a rectangular battery comprising a rectangular battery case. Moreover, the electrode assembly may be a laminate-type one configured by alternately laminating a plurality of positive electrodes and a plurality of negative electrodes via separators. In the present specification, the side of a sealing assembly 17 of the battery case 15 will be described as being "upward", and the bottom part side of an exterior can 16 will be described as being "downward" for convenience of description.

Figure 1:
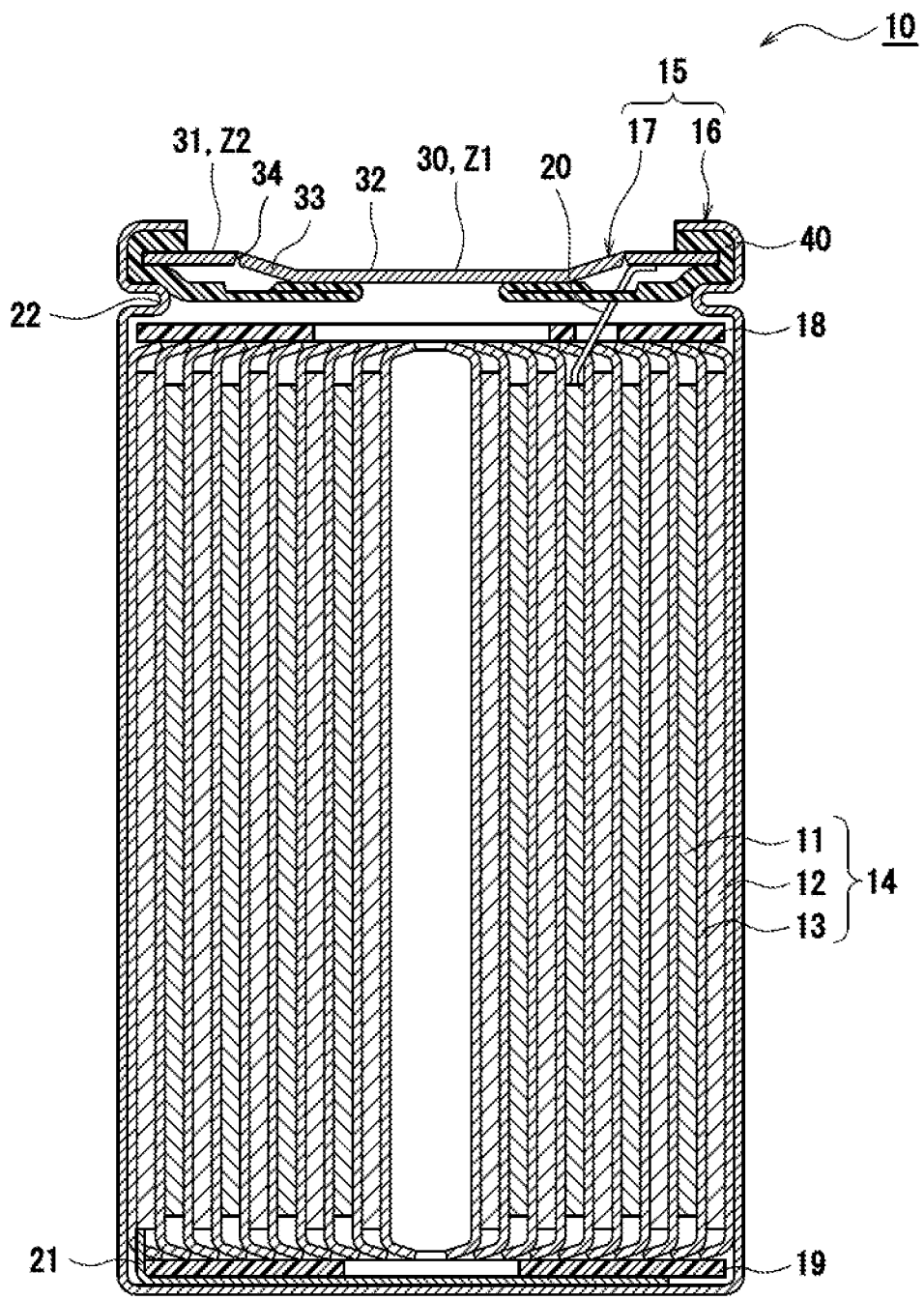
FIG. 1 is a sectional view of a sealed battery which is a first embodiment.

Hereafter, a first embodiment of the sealed battery according to the present disclosure will be described in detail with reference to FIG. 1 to FIG. 4($h$). FIG. 1 is a sectional, view of a sealed battery 10 which is the first embodiment. As exemplarily shown in FIG. 1, the sealed battery 10 comprises: the battery case 15 including the bottomed tubular exterior can 16 and the sealing assembly 17 sealing an opening of the exterior can 16; a gasket 40 arranged between the exterior can 16 and the sealing assembly 17; and the electrode assembly 14 including electrode leads and housed in the battery case 15. Moreover, an electrolyte is housed in the battery case 15. The electrode assembly 14 includes a positive electrode 11, a negative electrode 12, and separators 13 interposed between the positive electrode 11 and the negative electrode 12, and has a winding structure configured by winding the positive electrode 11 and the negative electrode 12 via the separators 13.

The electrolyte may be any of an aqueous electrolyte and a non-aqueous electrolyte. A preferable example of the sealed battery 10 is a non-aqueous electrolyte secondary battery, such as a lithium-ion battery, using a non-aqueous electrolyte. The non-aqueous electrolyte includes, for example, a non-aqueous solvent and an electrolyte salt dissolved in the non-aqueous solvent. For the non-aqueous solvent, there are used esters, ethers, nitriles, amides, mixed solvents of two or more of these, and the like. The non-aqueous solvent may contain a halogen-substituted substance having halogen atom(s) such as fluorine substituted for at least one or some of hydrogens in these solvents. Notably, the non-aqueous electrolyte is not limited to a liquid electrolyte but may be a solid electrolyte using a gelatinous polymer or the like. Foe the electrolyte salt, there is used a lithium salt such as $LiPF_6$.

The electrode assembly 14 includes the positive electrode 11 which is long, the negative electrode 12 which is long, the two separators 13 which are long, a positive electrode lead 20 joined to the positive electrode 11, and a negative electrode lead 21 joined to the negative electrode 12. In order to inhibit precipitation of lithium, the negative electrode 12 is formed in dimensions to some extent larger than those of the positive electrode 11. Namely, the negative electrode 12 is formed to be longer in the longitudinal direction and the transverse direction (up-down direction) than the positive electrode 11. The two separators 13 are formed in dimensions to some extent larger, at least, than those of the positive electrode 11, and are arranged, for example, so as to interpose the positive electrode 11.

The positive electrode 11 includes a positive electrode current collector, and positive electrode mixture layers provided on both sides of the positive electrode current collector. For the positive electrode current collector, there can be used a foil of a metal such as aluminum and aluminum alloy, which is stable in the potential range of the positive electrode 11, a film having the metal disposed in its surface layers, or the similar material. The positive electrode mixture layer includes a positive electrode active material, a conductive agent such as acetylene black, and a binder such as polyvinylidene fluoride (PVdF). The positive electrode 11 can be produced by applying positive electrode mixture slurry including the positive electrode active material, the conductive agent, the binder, and the like onto the positive electrode current collector, and drying, and compressing afterward, the coating film to form the positive electrode mixture layers on both sides of the positive electrode current collector.

For the positive electrode active material, a lithium-transition metal composite oxide is used, for example. Examples of metal elements contained in the lithium-transition metal composite oxide include Ni, Co, Mn, Al, B, Mg, Ti, V, Cr, Fe, Cu, Zn, Ga, Sr, Zr, Nb, In, Sn, Ta, and W. A preferable example of the lithium-transition metal composite oxide is a lithium-metal composite oxide containing at least one of the groups consisting of Ni. Co. and Mn. Specific examples thereof include a composite oxide containing Ni, Co. and Mn, and a composite oxide containing Ni, Co, and Al.

The negative electrode 12 includes a negative electrode current collector, and negative electrode mixture layers provided on both sides of the negative electrode current collector. For the negative electrode current collector, there can be used a foil of a metal such as copper and copper alloy, which is stable in the potential range of the negative electrode 12, a film having the metal disposed in its surface layers, or the similar material. The negative electrode mixture layer includes a negative electrode active material, and a binder such as styrene-butadiene rubber (SBR). The negative electrode 12 can be produced by applying negative electrode mixture slurry including the negative electrode active material, the binder, and the like onto the negative electrode current collector, and drying, and compressing afterward, the coating film to form the negative electrode mixture layers on both sides of the negative electrode current collector.

For the negative electrode active material, there is used, for example, graphite such as natural graphite such as flaky graphite, lumpy graphite, and earthy graphite, artificial graphite such as artificial lumpy graphite and graphitized mesophase carbon microbeads, or the similar material. For the negative electrode active material, there may be used a metal which is alloyed with lithium, such as Si and Sn, an alloy containing the metal, a compound containing the metal, or the like, and these may be used together with the graphite. Specific examples of the compound include silicon compounds expressed as $SiO_x$ ($0.5 \leq x \leq 1.6$).

Insulating plates 18 and 19 are arranged on the top and the bottom of the electrode assembly 14, respectively. In the example of FIG. 1, the positive electrode lead 20 attached to the positive electrode 11 extends to the sealing assembly 17 side through a through hole of the insulating plate 18, and the negative electrode lead 21 attached to the negative electrode 12 extends to the bottom part side of the exterior can 16 through the outside of the insulating plate 19. The positive electrode lead 20 is connected to the inner surface, of the battery case 15 of the sealing assembly 17, that faces the inside by welding or the like, and the sealing assembly 17 is a positive electrode external terminal. The negative electrode lead 21 is connected to the inner surface of the bottom part of the exterior can 16 by welding or the like, and the exterior can 16 is a negative electrode external terminal.

The exterior can 16 is a bottomed cylindrical metal-made container. The gasket 40 is provided between the exterior can 16 and the sealing assembly 17 and seals the inner space of the battery case 15. The exterior can 16 includes a grooved part 22 which is formed in its lateral surface part, for example, by spinning processing on the lateral surface part from the outside and supports the sealing assembly 17. The grooved part 22 is preferably formed into an annular shape along the circumferential direction of the exterior can 16, and supports the sealing assembly 17 on its upper surface.

The upper end part of the exterior can 16 is folded to the inside of the battery case and crimped on the peripheral edge of the sealing assembly 17. The opening of the exterior can 16 has a circular shape in plan view, and likewise, the sealing assembly 17 also has a circular shape in plan view. The sealing assembly 17 may be constituted of a plurality of components and is preferably constituted of one metal plate.

The metal plate constituting the sealing assembly 17 includes a thin part 34 formed into an annular shape. Moreover, the metal plate includes a vent part 30 enclosed by the thin part 34, and an annular part 31 which is positioned on the outside of the thin part 34 and to which the positive electrode lead 20 is connected. Namely, the vent part 30 and the annular part 31 are sectioned with the thin part 34. The thin part 34 is a portion having a smaller thickness than the vent part 30 and the annular part 31 and is an easily fracturing part which takes priority in fracturing more than the other portions when an internal pressure of the battery case 15 rises upon occurrence of abnormality in the battery. The sealing assembly 17 is fixed to the exterior can 16 via the gasket 40 by the annular part 31 pinched and held by the upper end part of the exterior can 16 and the grooved part 22.

The vent part 30 has a shape convex toward the inside of the battery case 15 (downward projecting shape) and is to invert so as to be convex toward the outside of the case (into an upward projecting shape) when the internal pressure of the battery case 15 reaches a predetermined inversion pressure R. It is further configured such that the thin part 34 fractures at the same time as that of the inversion of the vent part 30 (refer to FIG. 4(a) and FIG. 4(b)). Mentioned later in detail, the sealing assembly 17 is designed such that the thin part 34 is to fracture using inversion of the vent part 30, and moreover, an elastic deformation part provided in the gasket 40 assists the vent part 30 to be completely separated from the annular part 31 since it urges the vent part 30 toward the outside (upside) of the battery case 15. Thereby, the current path is securely disconnected.

As mentioned above, the sealing assembly 17 is preferably constituted of one metal plate including the vent part 30 and the annular part 31 sectioned with the thin part 34. In the present embodiment, the metal plate having the vent part 30 and the annular part 31 constitutes a top board of the sealing assembly 17. In this case, an external lead (not shown) is to be connected to an external device is connected to the vent part 30 by welding or the like, and the positive electrode lead 20 connected to the positive electrode 11 of the electrode assembly 14 is connected to the annular part 31 by welding or the like. Notably, the electrode lead connected to the annular part 31 is not limited to the positive electrode lead 20 but the negative electrode lead 21 may be connected to the annular part 31. In this case, the sealing assembly 17 is the negative electrode external terminal.

The sealing assembly 17 is manufactured, for example, using one metal plate, by forming the annular thin part 34 in the metal plate and performing press processing on the same so as to be convex toward the inside of the battery case 15. A preferably example of the metal plate is an aluminium alloy plate the main component of which is aluminum. The thickness of the metal plate is not specially limited but the portion thereof is, for example, 0.3 mm to 2 mm thick except for the thin part 34. The thickness of the thin part 34 is, for example, 10% to 50% of the thickness of the vent part 30. The thicknesses of the vent part 30 and the annular part 31 may be the same or may be different.

The thin part 34 is, for example, constituted of an annular groove. The thickness of the thin part 34 can be adjusted by changing the depth of the groove. The groove may be formed on the outer surface of the sealing assembly 17 but is preferably formed on the inner surface of the sealing assembly 17. The groove (thin part 34) is preferably formed into a circular shape that has no corners, particularly preferably formed into a substantially perfect circular shape. Herein, "substantially perfect circular" means to include a perfect circular shape and shapes which can be substantially recognized as a perfect circle. Notably, the shape of the thin part 34 is not limited to a groove shape but the thin part 34 may be set to have a thickness to such an extent that it can act as the easily fracturing part. For example, the thickness of the thin part 34 can be set such that the thickness of the metal plate continuously decreases as going from the vent part 30 to the thin part 34.

Since the vent part 30 and the annular part 31 are sectioned with the thin part 34 (groove) as mentioned above, the shapes of the vent part 30 and the annular part 31 in plan view are defined by the shape of the thin part 34 in plan view. The vent part 30, which is the portion enclosed by the thin part 34, preferably has a substantially perfect circular shape in plan view. In this case, it is easy to cause the thin part 34 to fracture completely across its total length. The annular part 31 existing on the outside of the vent part 30 is preferably formed into an annular shape in plan view having substantially constant inner diameter and outer diameter.

The area ratio between the vent part 30 and the annular part 31 is not specially limited but the area of the vent part 30 may be larger than or smaller than the area of the annular part 31.

The vent part 30 has a downward projecting shape convex toward the inside of the battery case 15 in the normal state of use where the internal pressure of the battery case 15 is lower than the inversion pressure R. Namely, the vent part 30 is recessed toward the inside of the battery case 15 as viewed from the outside of the battery case 15. The vent part 30 preferably expands to the electrode assembly 14 side to such an extent that it is not brought into contact with the electrode assembly 14. Moreover, when the internal pressure of the battery case 15 reaches the inversion pressure R, the vent part 30 inverts so as to take an upward projecting shape convex toward the outside of the battery case 15. Namely, the vent part 30 has a structure which enables deformation from a downward projecting shape to an upward projecting shape.

The shape of the vent part 30 may be any shape which enables inversion from a downward projecting shape to an upward projecting shape with the internal pressure of the battery case 15 and may be a shape in which the entire vent part 30 is curved into a dome shape. A preferable example of the vent part 30 includes a flat bottom part 32 most expanding to the electrode assembly 14 side, and an annular inclined part 33 formed around the bottom part 32. The inclined part 33 is formed to have a constant slope from the bottom part 32 toward the annular part 31, and a bent part exists at the boundary portion between the bottom part 32 and the inclined part 33. The bottom part 32 is formed to be substantially parallel to the annular part 31 and is arranged to be substantially parallel to the bottom part of the exterior can 16. The bottom part 32 has a substantially perfect circular shape in plan view. The inclined part 33 is formed into an annular shape in plan view so as to enclose the bottom part 32.

Figure 4A:
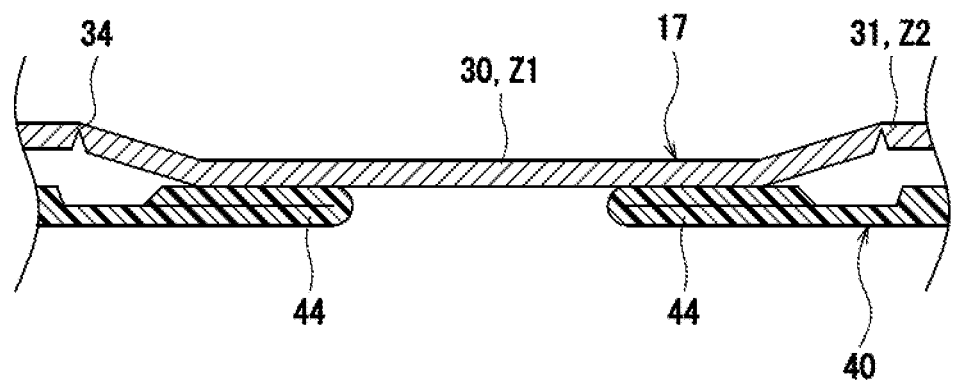
FIG. 4($a$) and FIG. 4($b$) show sectional views of a sealing assembly and the gasket which are the first embodiment, FIG. 4($a$) is a view showing a vent part before inversion, and FIG. 4($b$) is a view showing the vent part after the inversion and the ventilation.
Figure 4B:
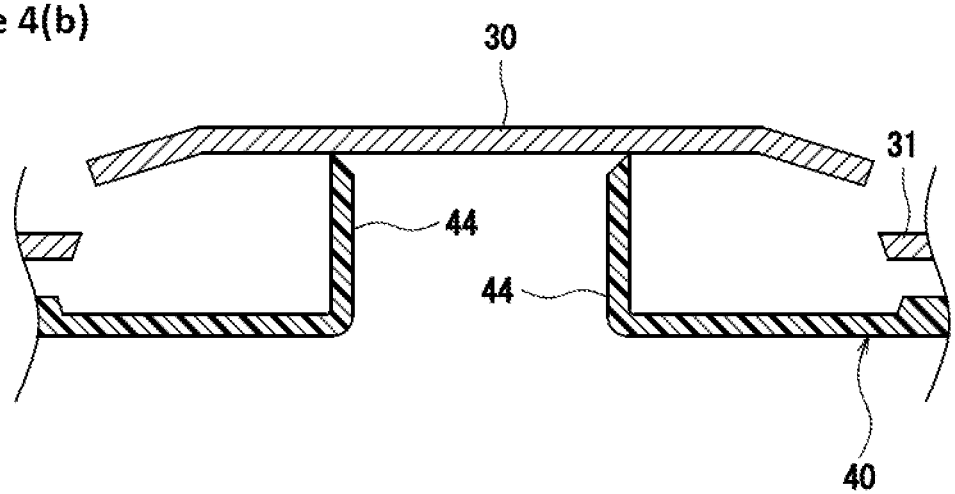

As shown in FIG. 4(a) and FIG. 4(b), the sealing assembly 17 (metal plate) has a structure in Which the thin part 34 is formed at the boundary position between an inversion part Z1 which is a portion which inverts from a downward projecting shape to an upward projecting shape and a non-inversion part Z2 which does not invert. In this case, a portion in which the downward projecting shape expanding to the electrode assembly 14 side is formed is the inversion part Z1 as a whole. Moreover, the metal plate may have a structure in which the inversion part Z1 (portion in the downward projecting shape) is formed beyond the range of the vent part 30, that is, as far as the annular part 31 positioned on the outside of the thin part 34. In this case, the thin part 34 is formed in an inclined part apart from the upper end of the downward projecting shape, and a part of the annular part 31, along with the vent part 30, also inverts into the upward projecting shape.

The metal plate (inversion part Z1) is preferably configured such that the inversion pressure R is smaller than a first vent pressure V1 for causing the thin part 34 to fracture while the vent part 30 is in the shape before the inversion and is not smaller than a second vent pressure V2 for causing the thin part 34 to fracture while the vent part 30 is in the shape after the inversion. With such design that R<V1, fracture of the thin part 34 before the inversion of the vent part 30 is inhibited. The fracture of the thin part 34 before the inversion of the vent part 30 can be more easily prevented as the difference between the inversion pressure R and the first vent pressure V1 is larger. Moreover, with such design that $V2 \leq R$, the thin part 34 more easily fractures at the same time as that of the inversion of the vent part 30.

The conditions of $V2 \leq R < V1$ can be realized, for example, by controlling the thicknesses of the vent part 30 and the thin part 34, the formation position of the thin part 34, the shape of the vent part 30, the degree of expansion of the inversion part Z1, the material composing the sealing assembly 17, and the like. Specifically, when the thickness of the vent part 30 (inversion part Z1) is reduced, the inversion pressure R tends to decrease since the vent part 30 easily inverts. Moreover, when the thickness of the thin part 34 is reduced, either the vent pressure V1 or V2 tends to decrease. When the internal pressure of the battery case 15 rises, shearing stress primarily acts on the thin part 34 from the vent part 30 in the downward projecting shape before the inversion, and tensile stress acts in addition to the shearing stress acts on the thin part 34 from the vent part 30 in the upward projecting shape after the inversion. Therefore, the condition of $V2 < V1$ is completed regardless of how much the thickness of the thin part 34 is changed by.

Figure 2:
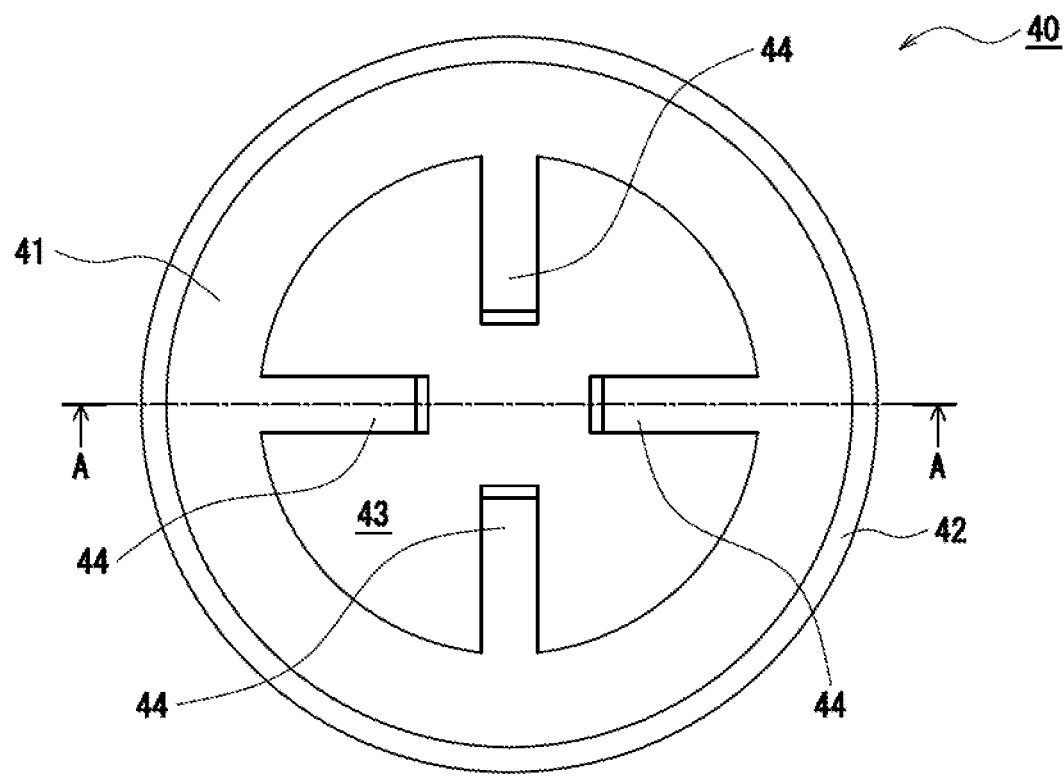
FIG. 2 is a plan view of a gasket which is the first embodiment.
Figure 3:
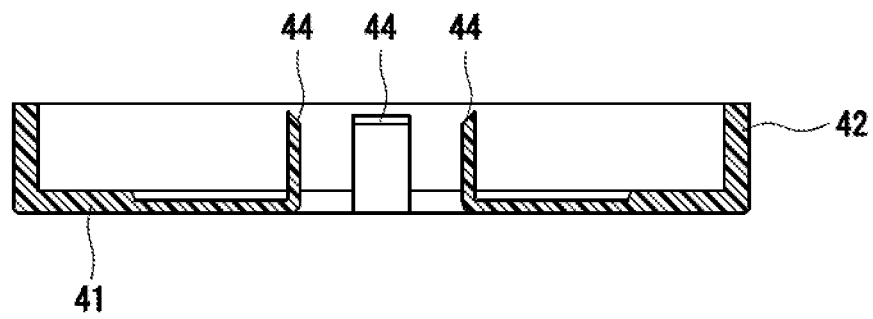
FIG. 3 is a sectional view taken along the AA line in FIG. 2.

Hereafter, the gasket 40 will be described in detail further with reference to FIG. 2 to FIG. 4(b). FIG. 2 is a plan view of the gasket 40, FIG. 3 is a sectional view taken along the AA line in FIG. 2, FIG. 4(a) and FIG. 4(b) show sectional views of the sealing assembly 17 and the gasket 40, FIG. 4(a) is a view showing the vent part 30 before inversion, and FIG. 4(b) is a view showing the vent part 30 of the sealing assembly 1 after the inversion and ventilation.

As exemplarily shown in FIG. 2 to FIG. 4(b), the gasket 40 is a bottomed cylindrical resin-made component including a disc-shaped bottom part 41 which comes into contact with the inner surface (lower surface) of the sealing assembly 17, and a sidewall part 42 formed into an annular shape along the outer peripheral edge of the bottom part 41. The sidewall part 42 intervenes between the exterior can 16 and the sealing assembly 17, insulates both components from each other, and blocks the gap between the components to seal the interior of the battery case 15. An opening 43 is formed in the bottom part 41. The opening 43 functions as a vent hole and is formed at a portion overlapping with the vent part 30 of the sealing assembly 17 in the up-down direction in the center part of the bottom part 41 in the radial direction. Moreover, the opening 43 is also a hole for allowing the positive electrode lead 20 to pass through.

Protrusions 44 are provided, in the gasket 40, each as the elastic deformation part which comes into contact with the inner surface of the vent part 30 to urge the vent part 30 toward the outside of the battery case 15. The protrusions 44 are folded in the state of coming into contact with the inner surface of the vent part 30 and are formed so as to protrude toward the outside of the battery case 15 when the vent part 30 inverts. The protrusions 44 are arranged in the state of being pressed by the vent part 30 having a downward projecting shape. Therefore, pressing force acts on the vent part 30 from the protrusions 44 toward the outside (upside) of the battery case 15. As above, the protrusions 44 are arranged in the state of urging the vent part 30.

The protrusions 44 resume their original shapes through elastic deformation when the pressing force from the vent part 30 comes not to act by the vent part 30 inverting and deforming so as to be convex toward the upside. Before the gasket 40 is incorporated into the battery, the protrusions 44 stand substantially vertical relative to the planar direction of the bottom part 41. The protrusions 44 protrude largely toward the upside and extend along the thickness direction of the bottom part 41. The protrusions 44 support the inversion of the vent part 30 with their urging force. Moreover, the gap between the separated vent part 30 and the annular part 31 is maintained by the protrusions 44 protruding largely toward the upside, and there can be reduced a possibility that reconduction of the current path occurs.

The protrusions 44 are preferably formed in plural. The plurality of protrusions 44 are formed at portions which can come into contact with the inner surface of the vent part 30 to press the vent part 30 toward the upside in the normal state of use of the battery. In the present embodiment, the plurality of protrusions 44 are formed on the peripheral edge of the opening 43. Each of the protrusions 44 extends from the peripheral edge of the opening 43 in directions toward the center of the opening 43 and are bent at their middles in the same direction as that of the sidewall part 42. Each protrusion 44 extending from the peripheral edge of the opening 43 is formed into a substantially L shape in sectional view.

The plurality of protrusions 44 are, for example, formed at substantially the same intervals along the circumferential direction of the bottom part 41. In the example of FIG. 2, four protrusions 44 are arranged at the same intervals along the peripheral edge of the opening 43, and moreover, the four protrusions 44 are aligned in radial directions of the bottom part 41. The protrusions 44 each have the same shape and dimensions, extend to the vicinity of the center of the opening 43 to such an extent that they are not brought into contact with one another, and are formed into a substantially cross shape in plan view. The number of protrusions 44 is not specially limited but is preferably two to twenty-one, still preferably three to eight.

As mentioned above, the protrusions 44 can be folded so as to be along the planar direction of the bottom part 41 from their original shapes which are in the state where they stand substantially vertical relative to the bottom part 41. Further, the protrusions 44 have restoring force with which they resume their original shapes from the state where they are folded so as to be along the planar direction of the bottom part 41. The protrusions 44 are pressed and folded by the inner surface of the vent part 30 when the battery is assembled. The protrusions 44 are preferably folded such that their tips face their base sides. The gasket 40 is composed of a resin material which includes, for example, flexibility which enables elastic deformation of the protrusions 44 and which is excellent in hermetic property, insulation property, chemical resistance, heat resistance, and the like.

The shape of the protrusions 44 is not specially limited but a preferable example of the shape is a substantially rectangular shape. A height H of the protrusion 44 (length from the upper surface of the bottom part 41 to the tip of the protrusion 44) is preferably set to be a length with which the gap between the vent part 30 and the annular part 31 can be maintained when the vent part 30 is separated from the annular part 31, and is, for example, 1 mm to 5 mm. There may be formed at the tip part of each protrusion 44 a tapered face which is inclined such that the height H lowers gradually from the outside of the bottom part 41 toward the inside thereof in the radial direction. Moreover, a like tapered face may be formed also at the bent part of the protrusion 44. Forming such a tapered face at the bent part of the protrusion 44 facilitates the folding of the protrusion 44.

As exemplarily shown in FIG. 4(b), when the internal pressure of the battery case 15 rises to exceed the predetermined threshold (inversion pressure R), the vent part 30 inverts so as to be convex toward the upside. In this stage, the plurality of protrusions 44 folded in the state where they come into contact with the inner surface of the vent part 30 resume their original shapes, which extend toward the upside, to protrude toward the space caused by the inversion of the vent part 30. The sealing assembly 17 is designed such that the vent part 30 is completely separated from the annular part 31 using the inversion of the vent part 30 when the thin part 34 fractures. Furthermore, the vent part 30 is more securely separated from the annular part 31 by the protrusions 44 extending toward the upside.

According to the sealed battery 10, while the sealing assembly 17 has a simple structure, the vent part 30 to which an external lead is to be connected can be easily completely separated from the annular part 31 to which the electrode lead is connected, and the current path of the battery can be more securely disconnected. Moreover, since the plurality of protrusions 44 protruding toward the upside prevent contact between the separated vent part 30 and the annular part 31, reconduction of the current path is highly inhibited.

Figure 5:
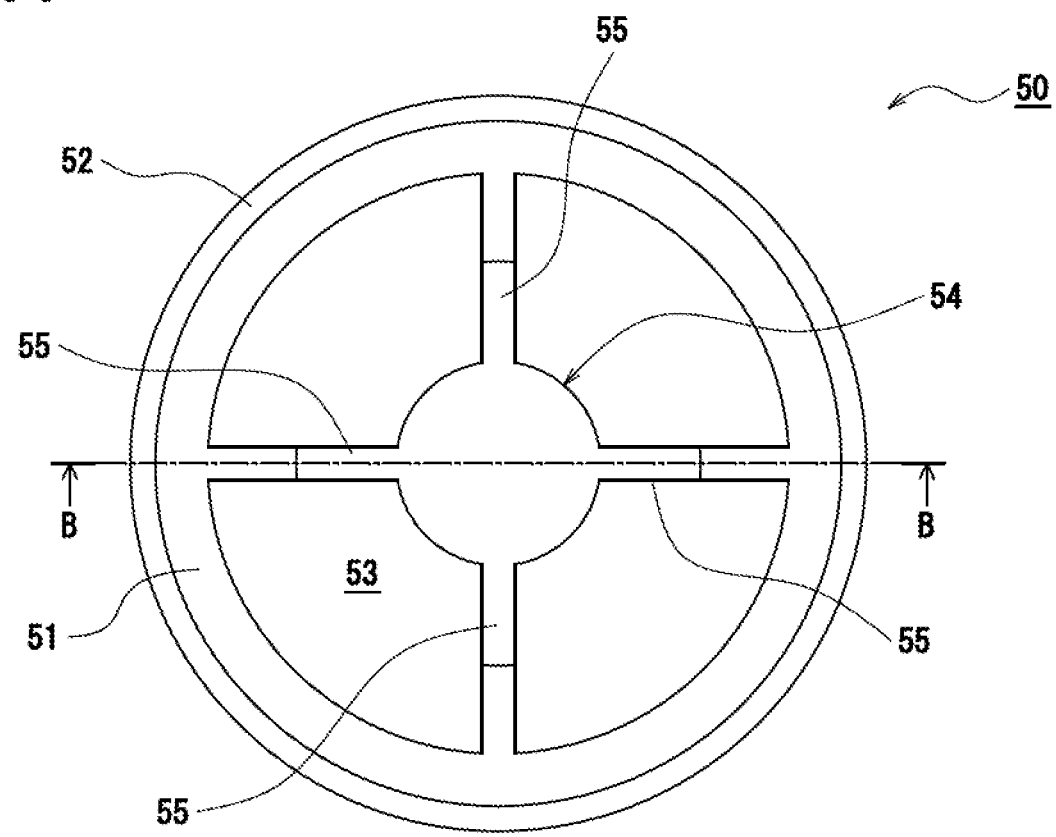
FIG. 5 is a plan view of a gasket which is a second embodiment.
Figure 6:
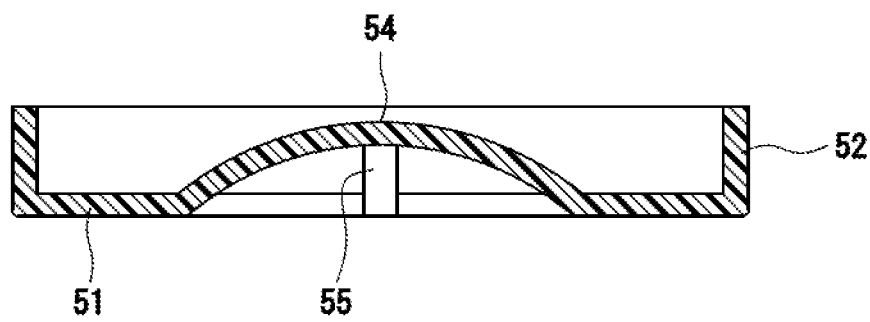
FIG. 6 is a sectional view taken along the BB line in FIG. 5.
Figure 7A:
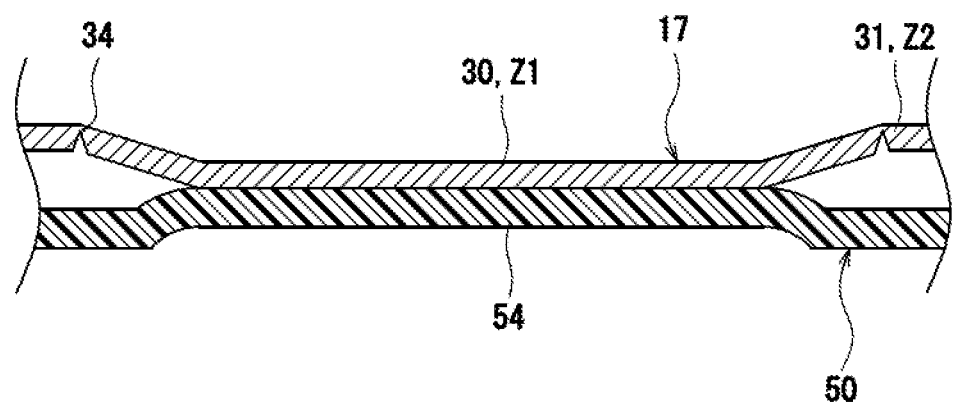
FIG. 7($a$) and FIG. 7($b$) show sectional views of a sealing assembly and the gasket which are the second embodiment FIG. 7($a$) is a view showing a vent part before inversion, and FIG. 7($b$) is a view showing the vent part after the inversion and ventilation.
Figure 7B:
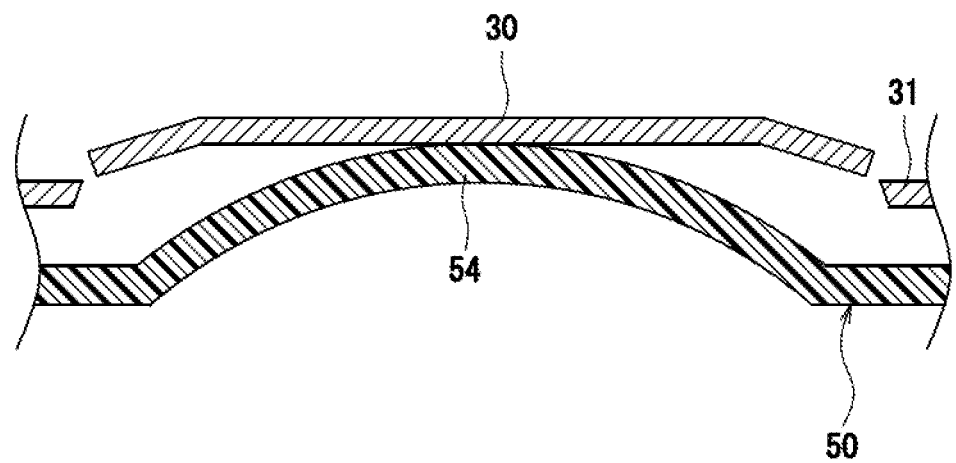

Hereafter, a second embodiment of the sealed battery according to the present disclosure will be described in detail with reference to FIG. 5 to FIG. 8. FIG. 5 is a plan view of a gasket 50 which is the second embodiment, FIG. 6 is a sectional view taken along the BB line in FIG. 5, FIG. 7(a) and FIG. 7(b) show sectional views of the sealing assembly 17 and the gasket 50, FIG. 7(a) is a view showing the vent part 30 before the inversion, and FIG. 7(b) is a view showing the vent part 30 of the sealing assembly 17 after the inversion and ventilation.

Notably, the second embodiment is different from the first embodiment only in the structure of the gasket, and as to those of the others, the similar structures to those of the first embodiment are applicable. Hereafter, its differences from the first embodiment will be mainly described, and the duplicate description will not be repeated.

As exemplarily shown in FIG. 5 to FIG. 7(b), the gasket 50, in common to the gasket 40 of the first embodiment, is a bottomed cylindrical resin-made component including a disc-shaped bottom part 51 which comes into contact with the inner surface of the sealing assembly 17, and a sidewall part 52 formed into an annular shape along the outer peripheral edge of the bottom part 51. There is formed in the bottom part 51 an opening 53 which functions as a vent hole and a through hole for the electrode lead. The sidewall part 52 intervenes between the exterior can 16 and the sealing assembly 17, insulates both components from each other, and blocks the gap between the components to seal the interior of the battery case 15.

A projection 54 is provided, in the gasket 50, as the elastic deformation part which comes into contact with the inner surface of the vent part 30 to urge the vent part 30 toward the outside of the battery case 15. The projection 54 comes into contact with the inner surface of the vent part 30 to be pressed into the inside of the battery case 15 and is formed so as to expand toward the outside of the battery case 15 when the vent part 30 inverts. The projection 54 is arranged in the state of being pressed by the vent part 30 having a downward projecting shape. Therefore, similarly to the protrusions 44 of the gasket 40, pressing force acts on the vent part 30 from the projection 54 toward the outside of the battery case 15. As above, the projection 54 is arranged in the state of urging the vent part 30.

The projection 54 is formed into a dome shape convex toward the upside and makes elastic deformation in the up-down direction. The projection 54 is depressed from the above by the vent part 30 in the normal state of use of the battery, and resumes its original dome shape through elastic deformation when the pressing force comes not to act by the inversion of the vent part 30. The projection 54 is formed of bridge parts 55, in band shapes in plan view, which extend from the peripheral edge of the opening 53 and each of which extends across from one end to the other end of the peripheral edge in a radial direction of the bottom part 51. The bridge parts 55 intersect at the center part of the bottom part 51 in the radial direction and are formed into a substantially cross shape in plan view. The projection 54 has an upward projecting shape in which the center part, of the bottom part 51 in the radial direction, at which the bridge parts 55 intersect most expands.

The opening 53 and the projections 54 are formed at a portion overlapping with the vent part 30 in the up-down direction in the center part of the bottom part 51 in the radial direction. The gasket 50 is preferably arranged such that the maximum expanding part of the projection 54 comes into contact with the center of the bottom part of the vent part 30. Notably, the number, the shape, and the like of bridge parts 55 are not specially limited. Moreover, the bridge parts 55 may shape a spring structure, or a coil-like spring structure or opening may be formed in the portion where the bridge parts 55 intersect.

Figure 8:
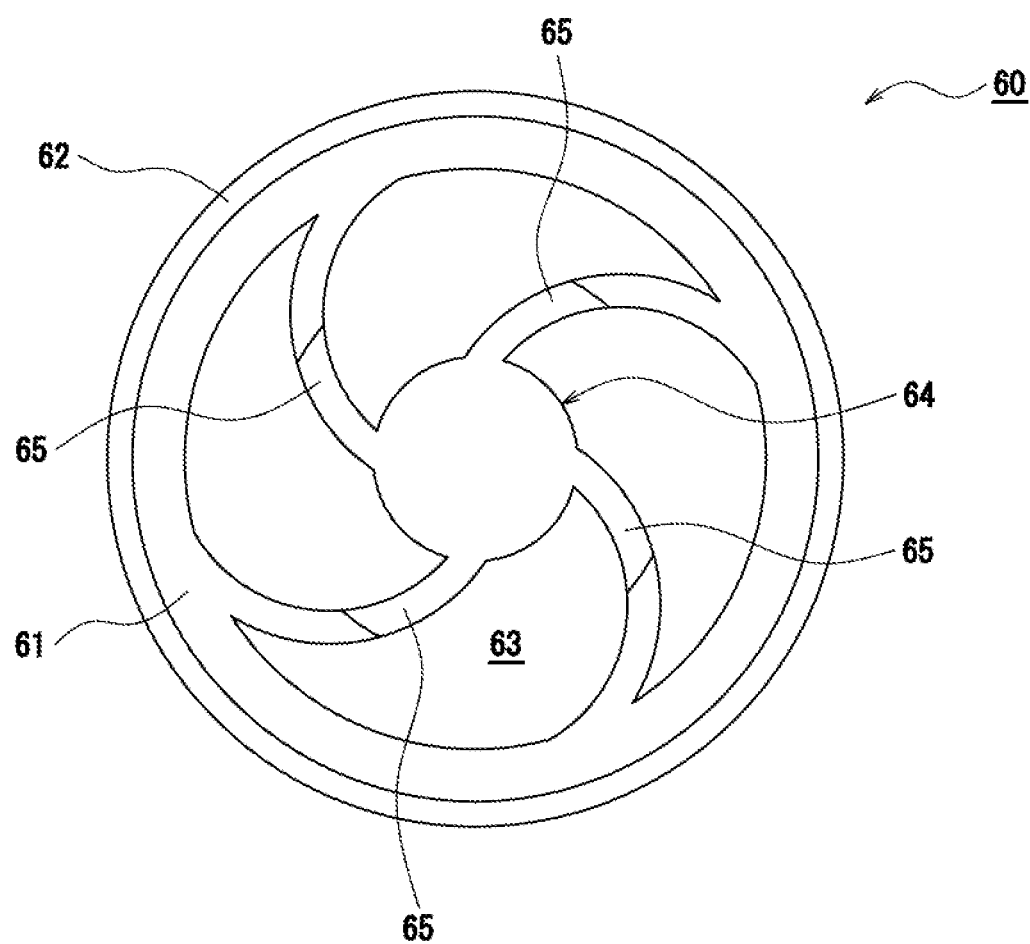
FIG. 8 is a view showing a modification of the second embodiment.

FIG. 8 is a plan view showing a gasket 60 which is a modification of the second embodiment. The gasket 60, in common to the gaskets 40 and 50, is a bottomed cylindrical resin-made component including a disc-shaped bottom part 61 which comes into contact with the inner surface of the vent part 30, and a sidewall part 62 formed into an annular shape along the outer peripheral edge of the bottom part 61. A projection 64 is provided as the elastic deformation part in the gasket 60 and an opening 63 is formed in the bottom part 61.

Similarly to the projection 54 of the gasket 50, the projection 64 is formed into a dome shape convex toward the upside with bridge parts 65 extending from the peripheral edge of the opening 63. The bridge parts 65 are formed into a spiral shape so as to concentrate at the center part of the bottom part 61 in the radial direction from a plurality of places on the peripheral edge of the opening 63. The projection 64 has an upward projecting shape in which the center part, of the bottom part 61 in the radial direction, at which the bridge parts 65 intersect most expands. The bridge parts 65 may shape a spring structure, or a coil-like spring structure or opening may be formed in the portion where the bridge parts 65 intersect.

Also, when the gasket 50, 60 is used, the inversion of the vent part 30 is supported by the projection 54, 64, and the vent part 30 can be easily completely separated from the annular part 31. Moreover, contact between the separated vent part 30 and the annular part 31 is prevented by the projection 54, 64 expanding toward the upside. Therefore, according to the sealed battery comprising the gasket 50, 60, the current path is easily disconnected upon occurrence of abnormality, and reconduction of the current path having once being disconnected is highly inhibited.

Notably, the aforementioned embodiments can be properly modified in terms of their design in the range which does not impair the object(s) of the present disclosure. For example, many acicular protrusions may stand on the upper surface of the gasket which is to come into contact with the inner surface of the vent part, in place of the protrusion 44 or the projection 54. Each of the acicular protrusions is the elastic deformation part which is pressed by the vent part 30 to bend from its base and which resumes its original shape when the vent part 30 inverts. Otherwise, an elastic deformation component such as a foamed material and a porous material may be pasted on the upper surface of the gasket.

REFERENCE SIGNS LIST 10 sealed battery, 11 positive electrode, 12 negative electrode, 13 separator, 14 electrode assembly, 15 battery case, 16 exterior can, 17 sealing assembly, 18, 19 insulating plate, 20 positive electrode lead, 21 negative electrode lead, 22 grooved part, 30 vent part, 31 annular part, 32 bottom part, 33 inclined part, 34 thin part, 40, 50, 60 gasket, 41, 51, 61 bottom part, 42, 52, 62 sidewall part, 43, 53, 63 opening, 44 protrusion, 54, 64 projection, 55, 65 bridge part, Z1 inversion part, Z2 non-inversion part

The invention claimed is:

1. A sealed battery, comprising:
a battery case including a bottomed tubular exterior can, and a sealing assembly sealing an opening of the exterior can;
a gasket arranged between the exterior can and the sealing assembly; and
an electrode assembly including an electrode lead and housed in the battery case, wherein
the sealing assembly includes a metal plate,
the metal plate includes:
a thin part formed into an annular shape;
a vent part that has a shape convex toward an inside of the battery case and is to invert so as to be convex toward an outside of the case when an internal pressure of the battery case reaches a predetermined inversion pressure R, the vent part enclosed by the thin part; and
an annular part that is positioned on an outside of the thin part and that the electrode lead is connected to, and an elastic deformation part that comes into contact with an inner surface of the vent part and urges the vent part toward the outside of the battery case is provided in the gasket.

2. The sealed battery according to claim 1, wherein
the elastic deformation part is a protrusion folded in a state of coming into contact with the inner surface of the vent part, and
the protrusion is formed so as to protrude toward the outside of the battery case when the vent part inverts.

3. The sealed battery according to claim 2, wherein
the gasket has an opening, and
a plurality of the protrusions is formed on a peripheral edge of the opening.

4. The sealed battery according to claim 1, wherein
the elastic deformation part is a projection coining, into contact with the Inner surface of the vent part to be pressed into the inside of the battery case, and
the projection is formed so as to expand toward the outside of the battery case when the vent part inverts.

5. The sealed battery according to claim 1, wherein the metal plate is configured such that the inversion pressure R is smaller than a first vent pressure V1 for causing the thin part to fracture while the vent part is in a shape before inversion (R<V1) and is not smaller than a second vent pressure V2 for causing the thin part to fracture while the vent part is in a shape after the inversion (V2≤R).

* * * * *